United States Patent [19]
Chiyokura et al.

[11] Patent Number: 5,179,644
[45] Date of Patent: Jan. 12, 1993

[54] SOLID MODELING METHOD

[75] Inventors: Hiroaki Chiyokura, Santa Clara, Calif.; Teiji Takamura, Matsudo, Japan; Hiroshi Toriya; Toshiaki Sato, both of Tokyo, Japan

[73] Assignee: Ricoh Company, Ltd., Tokyo, Japan

[21] Appl. No.: 685,152

[22] Filed: Apr. 8, 1991

Related U.S. Application Data

[63] Continuation of Ser. No. 321,295, Mar. 8, 1989, abandoned.

[30] Foreign Application Priority Data

Mar. 11, 1988 [JP] Japan .................................. 63-58790

[51] Int. Cl.⁵ .............................................. G06F 15/62
[52] U.S. Cl. .................................... 395/141; 395/133; 340/747
[58] Field of Search ...................... 364/518, 521, 522; 340/747, 750, 798, 799; 395/133, 134, 135, 141

[56] References Cited

U.S. PATENT DOCUMENTS

| | | | |
|---|---|---|---|
| 4,829,456 | 5/1989 | Joonishi et al. | 364/522 |
| 4,885,702 | 12/1989 | Ohba | 364/521 |
| 4,885,703 | 12/1989 | Deering | 364/522 |
| 4,888,713 | 12/1989 | Falk | 364/522 |
| 4,901,252 | 2/1990 | Fitzgerald et al. | 364/522 |

OTHER PUBLICATIONS

Elizabeth G. Houghton, Robert F. Emnett, James D. Factor and Chaman L. Sabharwal; Implementation of a Divide-and-Conquer Method for Intersection of Parametric Surfaces; Apr. 15, 1985; pp. 173-183.
R. E. Barnhill, G. Farin, M. Jordan and B. R. Piper; Surface/Surface Intersection; Jan. 5, 1987; pp. 3-16.
Malcolm S. Casale; Free-Form Solid Modeling with Trimmed Surface Patches; Jan. 1987; pp. 33-43.
Rida T. Farouki; Direct Surface Section Evaluation; pp. 319-334, Geometric Modeling, SIAM, Philadelphia, 1987.
Ramon F. Sarraga and William C. Waters; Free-Form Surfaces In GMSolid: Goals And Issues; pp. 187-204, New York, 1984.
Hiroshi Toriya, Toshiaki Satoh, Kenji Ueda, and Hiroaki Chiyokura; UNDO and REDO Operations for Solid Modeling; Apr. 1986; pp. 35-42.
Hiroaki Chiyokura; Localized Surface Interpolation Method for Irregular Meshes; pp. 3-19, Advanced Computer Graphics, Tokyo, 1986.
Toshiaki Satoh et al., "An Aid to the Modeling Process in a Trail and Error Environment using a History of Operations", (Nov. 7, 1988), pp. 49-56.
Masatomo Inui et al., "Representation and Manipulation of Solid Modeling Process in the Assumption-Based Truth Maintenance System", (1988), Dept. of Precision Machinery Engr., Faculty of Engineering, Univ. of Tokyo.
Hiroaki Chiyokura et al., "A Method of Representing the Solid Design Process", (Apr. 1985), pp. 32-41.

Primary Examiner—Gary V. Harkcom
Assistant Examiner—Phu K. Nguyen
Attorney, Agent, or Firm—Mason, Fenwick & Lawrence

[57] ABSTRACT

A solid modeling method for modeling solids which include free-form surfaces calculates intersecting portions of two solids and storing calculated results as first data, stores free-form shapes of the two solids as second data, approximates free-form surface portions of the two solids by polyhedrons so as to describe the two solids in a form of polyhedrons, obtains a union, a difference or an intersection of the two solids by carrying out set operations on the polyhedrons, and returns the polyhedrons obtained by the set operations into solids including free-form surfaces based on the stored first and second data.

22 Claims, 8 Drawing Sheets

SOLID MODELING METHOD

This application is a continuation of U.S. patent application Ser. No. 07/321,295, filed Mar. 8, 1989, now abandoned.

BACKGROUND OF THE INVENTION

The present invention generally relates to solid modeling methods for modeling solids which include free-form surfaces, and more particularly to a solid modeling method which uses a boundary representation to describe the solids.

In computer aided design (CAD) systems for designing a three-dimensional structure, there are CAD systems which are based on a solid modeler. Such CAD systems are presently used in various fields and has become popular. For this reason, there are demands for a powerful solid modeler. Presently, one of the highest of such demands is the realization of an improved CAD system for modeling solids which include free-form surfaces by carrying out a set operation. Several of such CAD systems have been proposed, but there are problems in that the processing speed is slow and the reliability is poor.

According to the conventional method of modeling a solid having free-form surfaces, an intersecting line of a curved surface and a plane and an intersecting line of a curved surface and a curved surface are first calculated. The methods of calculating the intersecting lines can be generally categorized into two, a first method being the method disclosed in E. G. Houghton et al., "Implementation of a Divide-and-Conquer Method for Intersection of Parametric Surfaces", Computer Aided Geometric Design, Vol. 2, No. 1, pp. 173-183, 1985 and a second method being the intersection tracing method disclosed in R. E. Barnhill et al., "Surface/Surface Intersection", Computer Aided Geometric Design, Vol. 4, No. 1, pp. 3-16, 1987. The set operation is carried out based on the intersecting lines calculated according to the first or second method.

Figure 1:
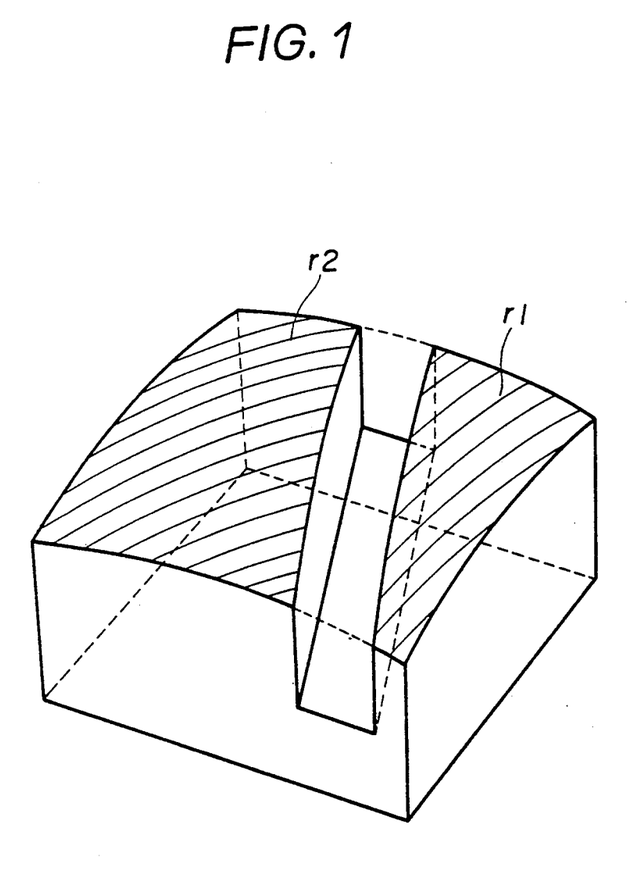
FIG. 1 is a perspective view for explaining trimmed surface patches.

The curved surface obtained by the set operation is generally described by a trimmed surface patch disclosed in M. S. Casale, "Free-Form Solid Modeling with Trimmed Surface Patches", IEEE CG & A, Vol. 7, No. 1, pp. 33-43, 1987. For example, the trimmed surface patch uses a portion of a patch to describe a shape as shown in FIG. 1. In FIG. 1, regions r1 and r2 are used to describe the shape.

However, the above described method suffers the following problems.

Firstly, when a bicubic parameter surface is used as the curved surface, an intersecting line of a curved surface and a curved surface becomes a 324-degree polynomial and an intersecting line of a curved surface and a plane becomes an 18-degree polynomial, as discussed in R. T. Farouki, "Direct Surface Evaluation", Geometric Modeling", G. Farin, Ed., SIAM, Philadelphia, pp. 319-334, 1987. Accordingly, it is not easy to stably obtain the intersecting lines for all cases, and for this reason, the reliability of the set operation which is based on obtaining the intersecting lines is not high.

Secondly, the degree of the intersecting lines is generally high and it is difficult to analytically obtain the intersecting lines. Thus, the intersecting lines are conventionally approximated by a large number of line segments or spline curves. In structural design, the intersecting lines play an important role and it is natural that the designer wishes to be able to modify the curves. But a local modification of edge lines of the solid described by the trimmed surface patches is not permitted.

Therefore, a known method describes the curved surfaces of the solid by the trimmed surface patches which describe the curved surface by an equation and a boundary of a region occupied by the curved surface, and calculates the intersecting portions of two solids when carrying out the set operation of the two solids. However, it is difficult to accurately and stably obtain the intersecting lines of the curved surfaces according to this method. For example, when a bicubic parametric surface is used as the curved surface, an intersecting line becomes a curved described by a 324-degree polynomial. In addition, according to this method, the generated intersecting lines cannot be modified. When the calculation of the intersecting line is in error, for example, there is also a problem in that the set operation becomes in error.

SUMMARY OF THE INVENTION

Accordingly, it is a general object of the present invention to provide a novel and useful solid modeling method in which the above described problems are eliminated.

Another and more specific object of the present invention is to provide a solid modeling method for modeling solids which include free-form surfaces, comprising the steps of calculating intersecting portions of two solids and storing calculated results as first data, storing free-form shapes of the two solids as second data, approximating free-form surface portions of the two solids by polyhedrons so as to describe the two solids in a form of polyhedrons, obtaining a union, a difference or an intersection of the two solids by carrying out set operations on the polyhedrons, and returning the polyhedrons obtained by the set operations into solids including free-form surfaces based on the stored first and second data.

According to the solid modeling method of the present invention, it is possible to realize the set operation of the free-form solid by adding a pre-process and an after-process to the set operation of the polyhedron. As a result, the method of the present invention is simple and the reliability thereof is high. When applied to a solid modeling system, it is possible to carry out the set operation on the solids including free-form surfaces, and the generated intersecting lines of the solids can be freely modified afterwards.

Other objects and further features of the present invention will be apparent from the following detailed description when read in conjunction with the accompanying drawings.

DETAILED DESCRIPTION

The present invention realizes a free-form solid by adding a pre-process and an after-process to a set operation of a polyhedron. According to the present invention, the trimmed surface patches are regenerated by Gregory patches which are known from the conventional repatching disclosed for example in R. F. Sarraga et al., "Free-Form Surfaces in GMSolid: Goals and Issues", Solid Modeling by Computers from Theory to Applications, M. S. Picket and J. W. Boyse Eds., Plenum Press, New York, pp. 237-253, 1984.

Figure 2:
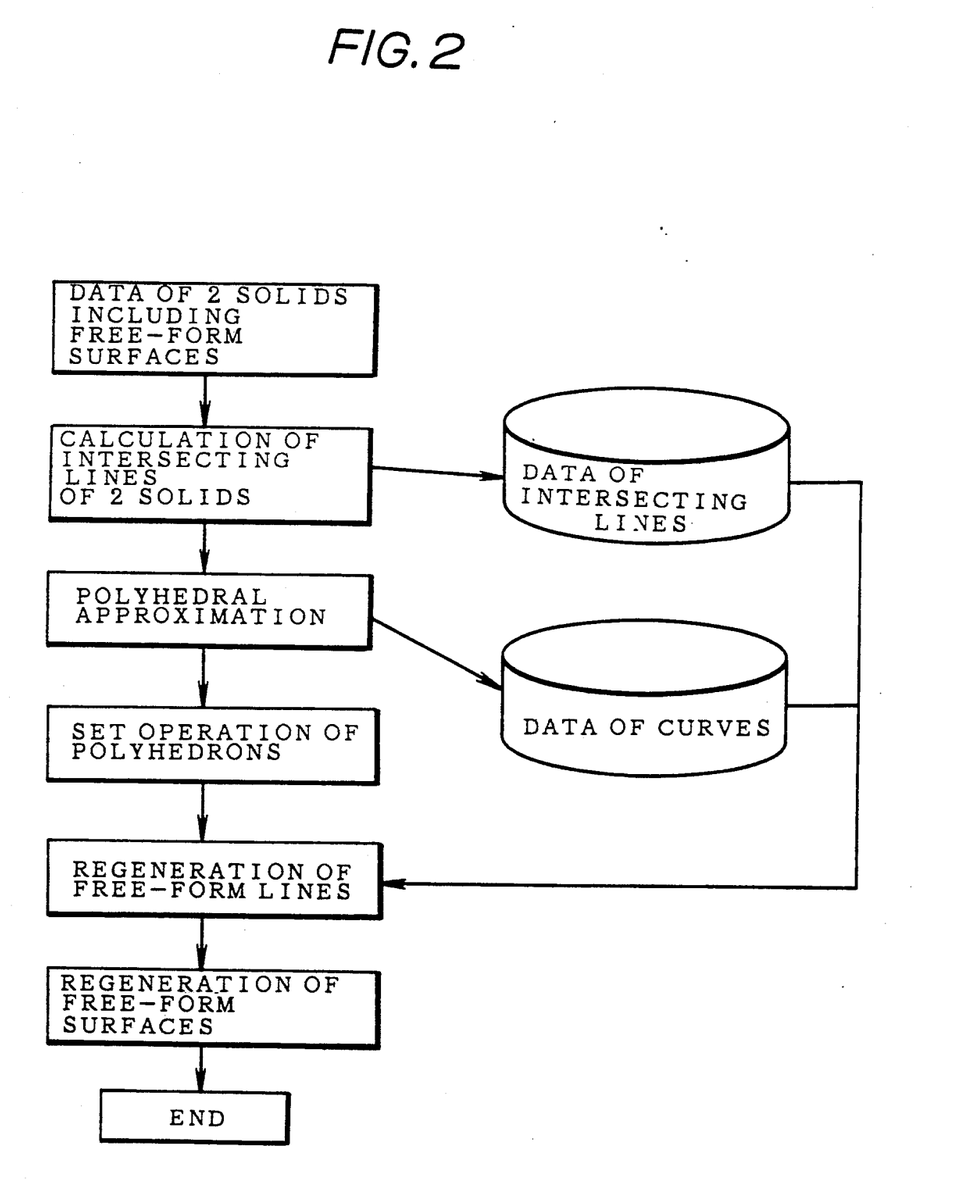
FIG. 2 is a flow chart for explaining an embodiment of a solid modeling method according to the present invention.

FIG. 2 is a flow chart for explaining an embodiment of the solid modeling method according to the present invention. In this embodiment, the set operation process of the free-form solid basically includes five operations (1) through (5).

(1) Calculation of the Intersections:

The intersecting lines of the curved surfaces of two solids are calculated. When the intersecting line cannot be obtained stably, it is sufficient to obtain an appropriate approximation of the intersecting line. The calculated results are stored as data in a table which is prepared in advance.

(2) Polyhedral Approximation:

Curved edge lines are converted into straight edge lines and the original curved line data are stored in a table. In addition, when there exits a surface which is not a plane, the solid is described in a form of a polyhedron by appropriately interpolating linear edge lines within the surface.

(3) Set Operations of the Polyhedrons:

The set operations of the solids described in the form of polyhedron are carried out. The conventional method of carrying out the set operation may be employed.

(4) Rounding of the Polyhedron:

The solids described in the form of the polyhedrons are regenerated as solids having the free-form surfaces, so as to return the polyhedrons into the solids including the original free-form surfaces based on the data stored in the tables by the operations (1) and (2).

(5) Regeneration of the Curved Surfaces:

The free-form surfaces are regenerated using the conventional repatching technique.

The conventional techniques may be employed to carry out the operations (1) and (2).

Figure 3A:
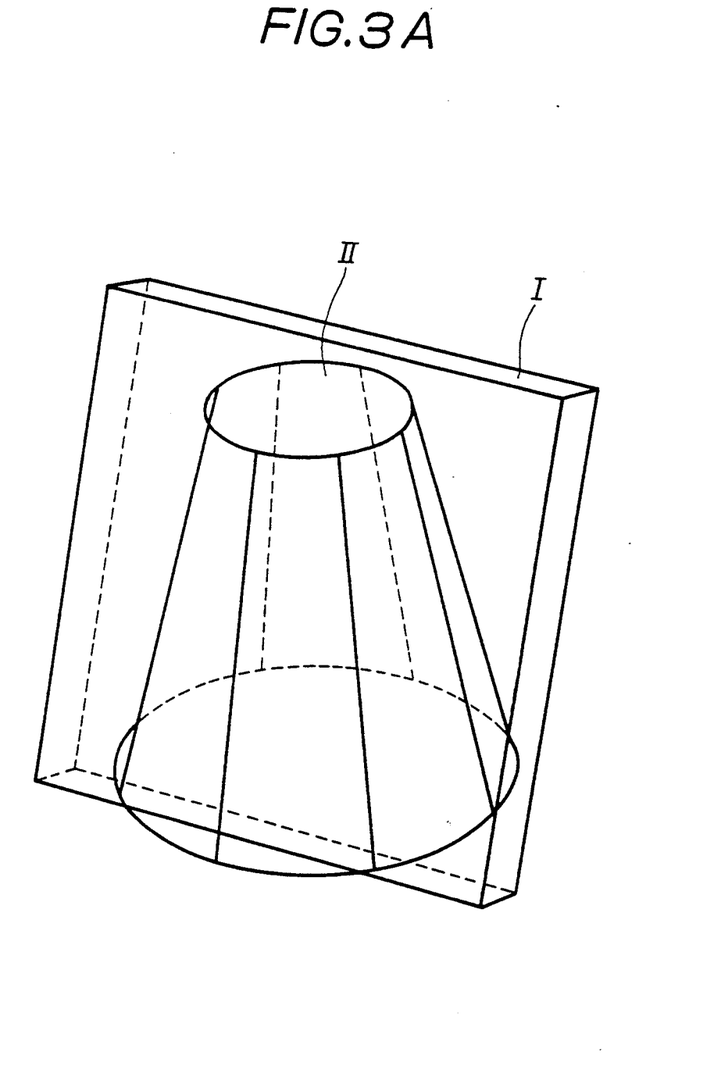
FIGS. 3A through 3D respectively are perspective views for explaining a set operation of a free-form solid.
Figure 3B:
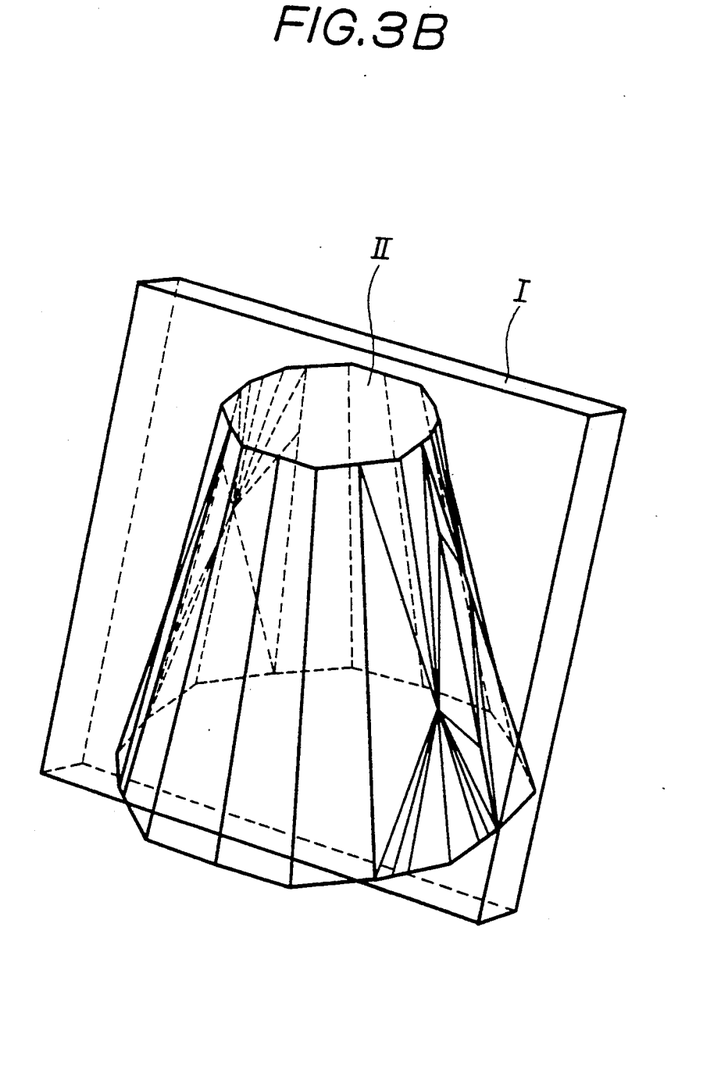
Figure 3C:
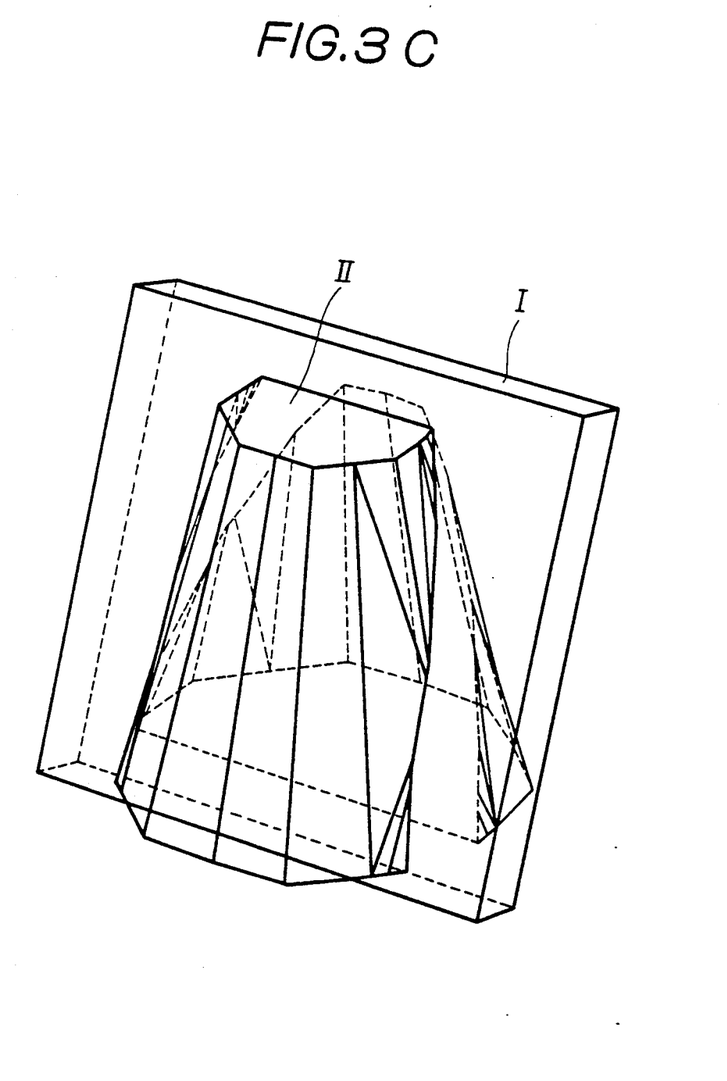
Figure 3D:
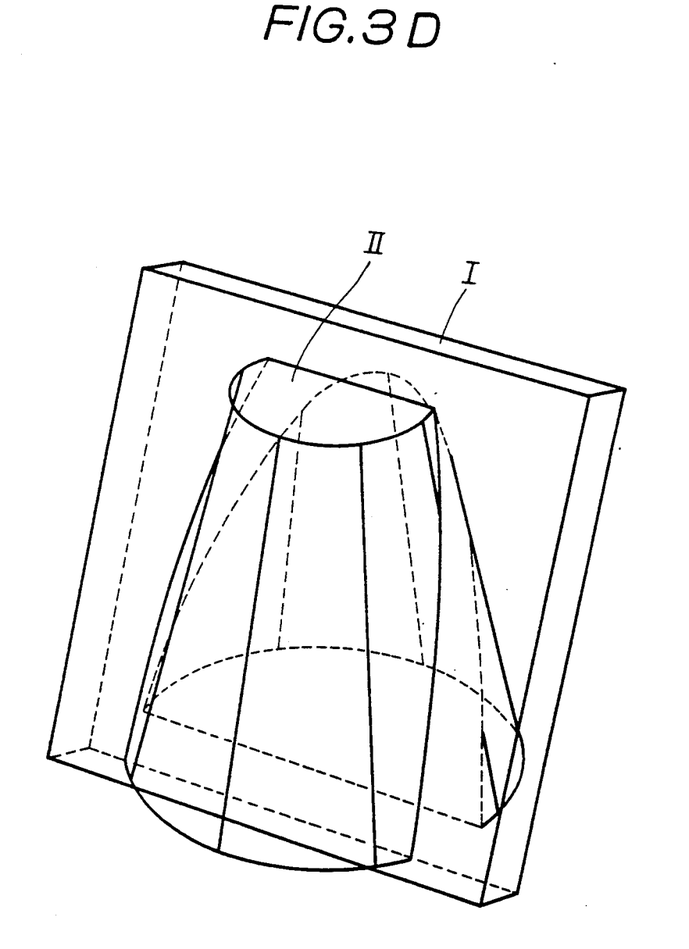

FIGS. 3A through 3D respectively are perspective views for explaining a set operation of a free-form solid. When it is assumed that set operations of two solids I and II shown in FIG. 3A are to be carried out, intersecting portions of the two solids I and II are first calculated and stored as data. Next, the solids I and II are approximated in the form of polyhedrons as shown in FIG. 3B, and set operations of the polyhedrons are carried out as shown in FIG. 3C. Finally, the curved surfaces are regenerated as shown in FIG. 3D based on the data of the curved lines which are stored in advance.

Next, a description will be given of the algorithm of the solid modeling method according to the present invention. The algorithm for carrying out the set operation of the free-form solid comprises five stages of processes which are highly independent of each other.

[1] Generation of the Intersections:

The intersecting points of all of the curved edge lines of one solid and the plane or curved surface of the other solid are obtained. Vertexes are generated on the intersecting points by use of the Euler operation. This process is also applicable to the all of the curved edge lines of the other solid. Next, the intersecting line of the curved surface and the curved surface and the intersecting line of the curved surface and the plane are calculated, and the calculated results are approximated by the Bezier curves. The calculated curves are not added to the original solids but are stored in a table. FIG. 3A shows the two solids applied with the set operation in conformance with the present invention.

[2] Approximation by Polyhedrons:

The solids including the curves are approximated by the polyhedrons. In order to make this approximation, the curved edge lines are first approximated by linear lines. Next, linear edge lines are generated within a surface which is not a plane, and the surface is divided into a plurality of planes. FIG. 3B show the polyhedrons obtained by these processes.

[3] Set Operations of the Polyhedrons:

Set operations of the approximated polyhedrons are carried out. FIG. 3C shows the solids after the set operations.

[4] Rounding of the Polyhedrons:

Unnecessary edge lines which were formed for the purpose of describing the original curved surfaces in the form of planes are eliminated, and the boundary edge lines of the surfaces are described by curves. In addition, intersecting lines described by the linear edge lines are approximated by Bezier curves. Finally, accurate edge lines are obtained from the table which is made in the stage [1], and these edge lines are replaced by approximated curved edge lines. FIG. 3D shows the solids obtainedc as a result of the these processes.

[5] Regeneration of the Curved Surfaces:

After carrying out the set operation, a portion of some curved surfaces are eliminated and triangular or pentagonal curved surfaces appear as a result. These triangular or pentagonal curved surfaces are interpolated by Gregory patches disclosed for example in H. Chiyokura, "Localized Surface Interpolation Method for Irregular Meshes", Advanced Computer Graphics, T. L. Kunii, Ed., Springer-Verag, Tokyo, pp. 3-19, 1986.

Figure 4A:
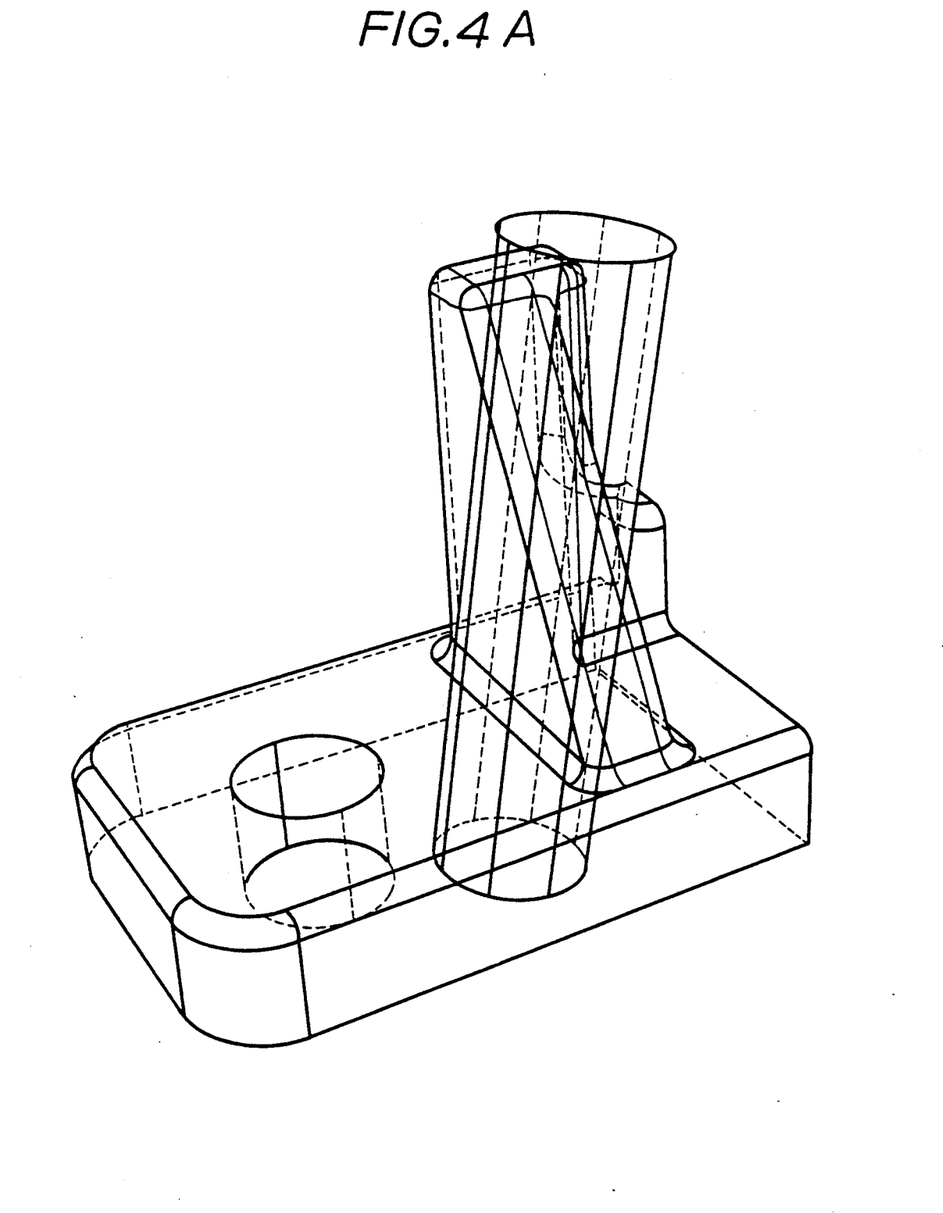
FIGS. 4A and 4B respectively are perspective views for explaining the set operation.
Figure 4B:
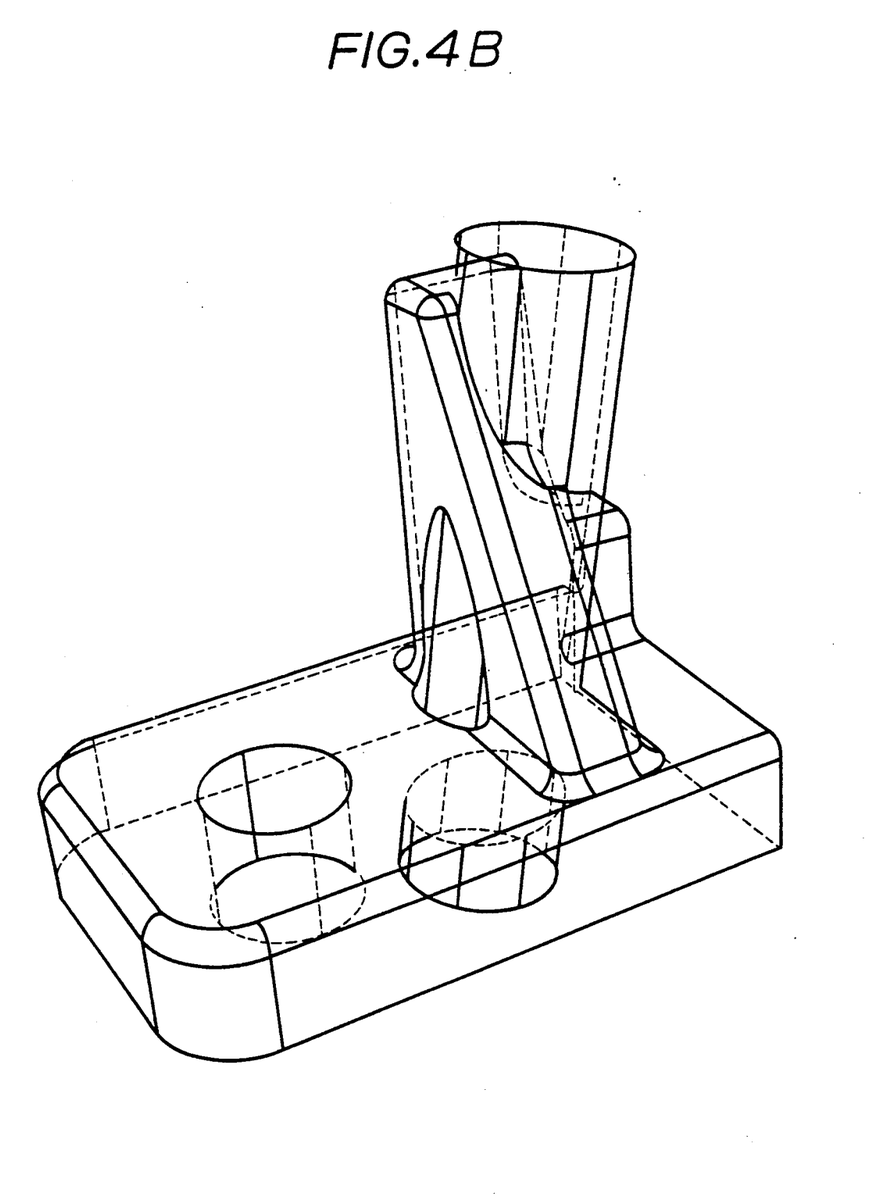

FIGS. 4A and 4B respectively show the solids before and after carrying out the stages [1] through [5] of the processes.

Therefore, according to the solid modeling method of the present invention, the following advantageous features are obainable.

Firstly, when the set operation of the polyhedron is given, a most general method of application to the free-form surface is to make a modification within the process. However, since the algorithm of the set operation itself is complex, such a modification is difficult. On the other hand, according to the present invention, the set operation of the polyhedron is treated as a black box, and only the pre-process and the after process are made. For this reason, the realization and maintenance of the modeling process is facilitated.

Secondly, the intersecting line of the curved surface and the curved surface, and the intersecting line of the curved surface and the plane are calculated in the pre-process, but the set operation can be carried out even if the intersecting line cannot be calculated. When the intersecting line cannot be found, the intersecting line is given as line segments by the set operation of the polyhedron, and these line segments are converted into the curve by the after-process. Hence, the set operation can be carried out stably.

Thirdly, because the solid modeling method according to the present invention regenerates the curved surfaces, the designer can freely modify the intersecting lines generated by the set operation. In addition, the patches for describing the shape are used as a whole and not in portions, thereby simplifying the data structure and facilitating the development of the application program.

Further, the present invention is not limited to these embodiments, but various variations and modifications may be made without departing from the scope of the present invention.

What is claimed is:

1. A computer-based solid modeling method for modeling intersecting original solids which include free-form surfaces, the computer including means for executing operations and areas for storing information, the computer-based solid modeling method comprising the steps of:
   (a) executing a calculating operating on data representing two original solids based on such information as (i) an intersecting line of two curved surfaces and (ii) an intersecting line of curved surfaces and planes; and storing calculated intersection results in a first data storage area, the calculated intersection results not being added to the data representing the original solids;
   (b) executing an approximating operation on the data representing the two original solids not including the calculated intersection results, for approximating free-form surface portions of the two solids by calculating data describing polyhedrons; and storing data describing original curves of the original solids known before the approximating operation in a second data storage area, the original curves constituting boundary curves of the free-form surfaces, the data describing polyhedrons not being stored in the second data storage area;
   (c) executing set operations on the data describing polyhedrons, for obtaining such set operation results as a union, a difference or an intersection of the data describing polyhedrons, the set operations not executing based on the calculated intersection results stored in the first data storage area or on the data describing original curves stored in the second storage area; and
   (d) executing a regeneration operation for re-converting set operation results based on the data describing polyhedrons obtained by the set operations into regenerated solids including the free-form surfaces, the regeneration operation based on the data describing polyhedrons as well as the calculated intersection results stored in the first data storage area and the data describing original curves of the original solids stored in the second data storage area.

2. The solid modeling method as claimed in claim 1, wherein the calculating operation includes the substeps of:
   obtaining intersecting points of all of curved edge lines of one of the two original solids and a plane or curved surface of the other of the two original solids;
   generating vertexes on the intersecting points; and
   approximating the calculated intersection results by Bezier curves.

3. The solid modeling method as claimed in claim 2, wherein:
the substeps of obtaining intersecting points and generating vertexes are carried out with respect to all curved edge lines of the two original solids.

4. The solid modeling method as claimed in claim 1, wherein the step of storing original curves includes:
   converting curved edge lines of the two original solids into straight edge lines; and
   storing data of curves of the original solids in the second data storage area.

5. The solid modeling method as claimed in claim 4, wherein the step of storing original curves further includes:
   interpolating straight edge lines in a nonplanar surface.

6. The solid modeling method as claimed in claim 1 wherein the regeneration operation includes:
   eliminating a resultant polyhedron that was obtained as a result of carrying out a Boolean operation on the polyhedron which was formed in the approximating operation to represent the curved surfaces as planes; and
   representing boundary edge lines of surfaces as curves.

7. The solid modeling method as claimed in claim 6, wherein the regeneration operation further includes:
   approximating intersecting lines described by arbitrary straight edge lines by Bezier curves.

8. The solid modeling method as claimed in claim 7, wherein the regeneration operation further includes:
   obtaining accurate edge lines stored in the calculating operation; and
   replacing the accurate edge lines by approximating curved edge lines.

9. The solid modeling method as claimed in claim 1, wherein the regeneration operation includes:
   regenerating the free-form surfaces by a repatching process.

10. The solid modeling method as claimed in claim 9, wherein the repatching process includes:
    interpolating surfaces which correspond to portions of the curved surfaces eliminated by the set operations by curved surfaces.

11. The solid modeling method as claimed in claim 9, wherein the repatching process includes:
    interpolating triangular or pentagonal surfaces which correspond to portions of the curved surfaces eliminated by the set operations by curved surfaces.

12. A computer-based solid modeling method for modeling intersecting original solids which include free-form surfaces, the computer including means for executing operations and areas for storing information, the computer-based solid modeling method comprising the steps of:
    (a) choosing set operations for operating on data describing polyhedrons for obtaining set operation results such as a union, a difference or an intersection of the data describing the polyhedrons;
    (b) executing a pre-process before the set operations, the pre-process including:
      (1) executing a calculating operation on data representing two original solids based on such information as (i) an intersecting line of two curved surfaces and (ii) an intersecting line of curved surfaces and planes; and storing calculated intersection results in a first data storage area, the calculated intersection results not being added to the data representing the original solids; and (2) executing an approximating operation on the data representing the two original solids not including the calculated intersection results, for approximating free-form surface portions of the two solids by calculating data describing polyhedrons; and storing data describing original curves of the original solids known before the approximating operation in a second data storage area, the original curves constituting boundary curves of the free-form surfaces, the data describing polyhedrons not being stored in the second data storage area;

(c) executing the set operations chosen in step (a); and (d) executing an after-process after the set operations, the after-process including:

(1) executing a regeneration operation for re-converting set operation results based on the data describing polyhedrons obtained by the set operations into regenerated solids including the free-form surfaces, the regeneration operation based on the data describing polyhedrons as well as the calculated intersection results stored in the first data storage area and the data describing original curves of the original solids stored in the second data storage area.

13. The solid modeling method as claimed in claim 12, wherein the calculating operation includes the substeps of:

obtaining intersecting points of all of curved edge lines of one of the two original solids and a plane or curved surface of the other of the original two solids;

generating vertexes on the intersecting points; and approximating the calculated intersection results by Bezier curves.

14. The solid modeling method as claimed in claim 13, wherein:

the substeps of obtaining intersecting points and generating vertexes are carried out with respect to all curved edge lines of the two original solids.

15. The solid modeling method as claimed in claim 12, wherein the step of storing original curves includes:

converting curved edge lines of the two original solids into straight edge lines; and storing data of curves of the original solids in the second data storage area.

16. The solid modeling method as claimed in claim 15, wherein the step of storing original curves further includes:

interpolating straight edge lines in a nonplanar surface.

17. The solid modeling method as claimed in claim 12, wherein the regeneration operation includes:

eliminating a resultant polyhedron obtained as a result of carrying out a Boolean operation on the polyhedron which was formed in the approximating operation to represent the curved surfaces as planes; and representing boundary edge lines of surfaces as curves.

18. The solid modeling method as claimed in claim 17, wherein the regeneration operation further includes:

approximating intersecting lines described by arbitrary straight edge lines by Bezier curves.

19. The solid modeling method as claimed in claim 18, wherein the regeneration operation further includes:

obtaining accurate edge lines stored in the calculating operation; and replacing the accurate edge lines by approximating curved edge lines.

20. The solid modeling method as claimed in claim 12, wherein the regeneration operation includes:

regenerating the free-form surfaces by a repatching process.

21. The solid modeling method as claimed in claim 20, wherein the repatching process includes:

interpolating surfaces which correspond to portions of the curved surfaces eliminated by the set operations by curved surfaces.

22. The solid modeling method as claimed in claim 20, wherein the repatching process includes:

interpolating triangular or pentagonal surfaces which correspond to portions of the curved surfaces eliminated by the set operations by curved surfaces.

* * * * *